United States Patent

Tsao

[15] 3,660,248
[45] May 2, 1972

[54] NEUTRALIZATION AND DRYING OF HALOGENATED AND ALKYLATED HYDROCARBONS

[72] Inventor: Utah Tsao, Jersey City, N.J.
[73] Assignee: The Lummus Company, Bloomfield, N.J.
[22] Filed: Mar. 6, 1969
[21] Appl. No.: 804,842

[52] U.S. Cl. ................................203/7, 203/37, 203/39, 203/14, 203/86, 203/98, 203/67, 260/652 P, 260/671, 260/683.74
[51] Int. Cl. ..........................B01d 3/34, C07c 19/00
[58] Field of Search ..................203/6, 7, 14, 33, 36, 37, 39, 203/98, 86, 67; 260/652 P, 668, 671, 674 A, 683.74

[56] References Cited

UNITED STATES PATENTS

| | | | |
|---|---|---|---|
| 2,589,212 | 3/1952 | Agapetus et al. | 203/37 |
| 2,753,297 | 7/1956 | Mason | 203/37 |
| 2,908,640 | 10/1959 | Dougherty | 203/7 |
| 3,189,537 | 6/1965 | Carlton | 203/7 |
| 3,442,771 | 5/1969 | Jordan et al. | 203/36 |
| 3,447,891 | 6/1969 | Crawford | 203/7 |

FOREIGN PATENTS OR APPLICATIONS

| | | | |
|---|---|---|---|
| 462,907 | 1/1950 | Canada | 203/7 |
| 933,497 | 6/1961 | Great Britain | 203/37 |
| 703,613 | 2/1965 | Canada | 203/37 |

Primary Examiner—Wilbur L. Bascomb, Jr.
Attorney—Richard J. Holton, Kevin B. Clarke and Joel G. Ackerman

[57] ABSTRACT

Halogenated and alkylated products containing corrosive acids are neutralized and dried by contact with caustic in a neutralization system in which the neutralized product is separated into aqueous and organic phases. The organic phase is azeotropically distilled in a drying tower to obtain neutralized, dried halogenated product and an overhead containing halogenated product, water and trace amounts of the corrosive acid formed during the distillation. The overhead is recycled to the neutralization system after being mixed with caustic upstream of the neutralization system, whereby the need to protect the neutralization system and recycling system from the effects of the corrosive acid is avoided.

15 Claims, 2 Drawing Figures

PATENTED MAY 2 1972　　　　　　　　　　　　　3,660,248

INVENTOR
UTAH TSAO

3,660,248

NEUTRALIZATION AND DRYING OF HALOGENATED AND ALKYLATED HYDROCARBONS

BACKGROUND OF THE INVENTION

1. Field of the Invention

This invention relates to neutralizing and drying the reaction products of halogenation, oxyhalogenation, alkylation and isomerization processes. More particularly, it relates to neutralizing and drying reaction products containing water and corrosive acids in a manner such that the neutralizing system and recycling system need not be protected against the corrosive effect of the acid.

The invention also relates to apparatus for neutralizing and drying the reaction products of said processes.

2. Description of the Prior Art

The halogenation and oxyhalogenation processes are known and according to these processes there are usually obtained halogenated products which contain water and corrosive acids, generally HCl. The halogenated product is neutralized with a solution of caustic and washed with water. The halogenated product after being neutralized and separated from the water is sent to a drying column to remove the dissolved water by azeotropic distillation. The dissolved water is removed as an overhead which is condensed and separated into aqueous and organic phases. The organic phase is recycled to the drying column and the aqueous phase which is acidic as a result of decomposition of the product during distillation is discarded.

Since there is always some decomposition of the halogenated product in the drying column, the overhead will always contain some corrosive acid. In order to prevent corrosion of the overhead system, it must be protected against the effect of the acid and accordingly, acid resistant alloys such as monel, hastalloy and silver have been used in the overhead system.

According to the present invention, for reasons which will be described in detail below, the entire overhead and neutralization systems may be constructed of carbon steel, thereby effecting a substantial saving in the apparatus for the performance of the process.

SUMMARY OF THE INVENTION

It is an object of the present invention to provide improved processes for purifying the reaction products of the halogenation and oxyhalogenation processes; and also for the reaction products of the alkylation process (e.g. the Friedel-Kraft reaction) and the isomerization process. It is another object of this invention to provide such a process in which the neutralization and drying steps are integrated. It is a further object of the invention to provide such a process in which the need to use expensive, corrosion-resistant alloys in the apparatus is obviated. A still further object of the invention is to provide such a process in which there is produced a waste aqueous phase which is not acidic and which therefore can be readily disposed of without requiring treatment of the acid which would otherwise be contained therein. Yet another object of the invention is to provide improved apparatus for the neutralization and drying of the above said reaction products. These and still further objects will become apparent from the detailed description of this invention which is given below.

According to the invention, a reaction product, produced for example by the halogenation, preferably, the chlorination of an olefin such as ethylene, and including a halogenated organic compound, which in the case of ethylene is ethylene dichloride (hereinafter referred to as EDC), a corrosive acid, which in the case of chlorination is HCl, and water is conducted to a neutralizing system where it is contacted with a recycle stream of halogenated organic compound, water and a trace of corrosive acid, said stream being mixed with a caustic solution prior to its introduction into the neutralizing system. In the neutralizing system, the caustic effectively neutralizes all the acid in the reaction product and the neutralized reaction product is separated into aqueous and organic phases. The aqueous phase is slightly alkaline and can be discarded as is without requiring any further treatment. In contrast, if this aqueous phase were acidic, special handling would be necessary to neutralize the acid before discarding same.

The organic phase is substantially all halogenated organic compound with a relatively small portion of water dissolved therein, for example, about 1 part of water per 500 parts of halogenated organic compound. In order to remove the dissolved water, the organic phase is conducted to a drying tower where it is distilled. Illustratively, the drying column can be a reboiled valve tray drying column. An azeotrope constituted of the dissolved water and a portion of the halogenated organic compound is obtained as an overhead from the drying tower and pure neutralized dry halogenated organic compound is obtained as a bottom from the drying tower.

In addition to the azeotropic mixture of water and halogenated organic compound, the overhead contains a trace amount (e.g., less than 10 parts per million) of the corrosive acid. It should be noted that the trace amount of corrosive acid is not present in the organic phase which is conducted to the drying tower, but rather is formed in the drying tower as a result of slight decomposition of the halogenated organic compound during the distillation therein. Normally, this trace amount of corrosive acid necessitates the use of acid-resistant alloys in the overhead line and the neutralizing system to protect those regions from corrosion, since according to the prior art, the overhead is separated into an acidic aqueous phase and an organic phase, the former being discarded and the latter being returned to the drying tower. Thus, in the prior art, the overhead line and the drum in which the overhead is separated are both subject to attack by corrosive acid. In the present invention however, the overhead containing a trace of corrosive acid is recycled to the neutralizing system in order to recover the halogenated organic compound in the overhead. However, prior to the introduction of the overhead into the neutralizing system, a caustic solution is mixed with the overhead to effect neutralization of the trace of corrosive acid and thereby eliminate the need for acid-resistant alloys in the overhead line below the point of mixing of overhead and caustic. Then, the mixture of overhead and caustic is introduced to the neutralizing system where it meets the incoming reaction product which is to be neutralized therein. Thus, there is provided a continuous economical process for purifying a halogenated reaction product without the need for protecting extensive portions of the system against the effect of corrosive acid.

DETAILED DESCRIPTION OF THE INVENTION

Figure 1:
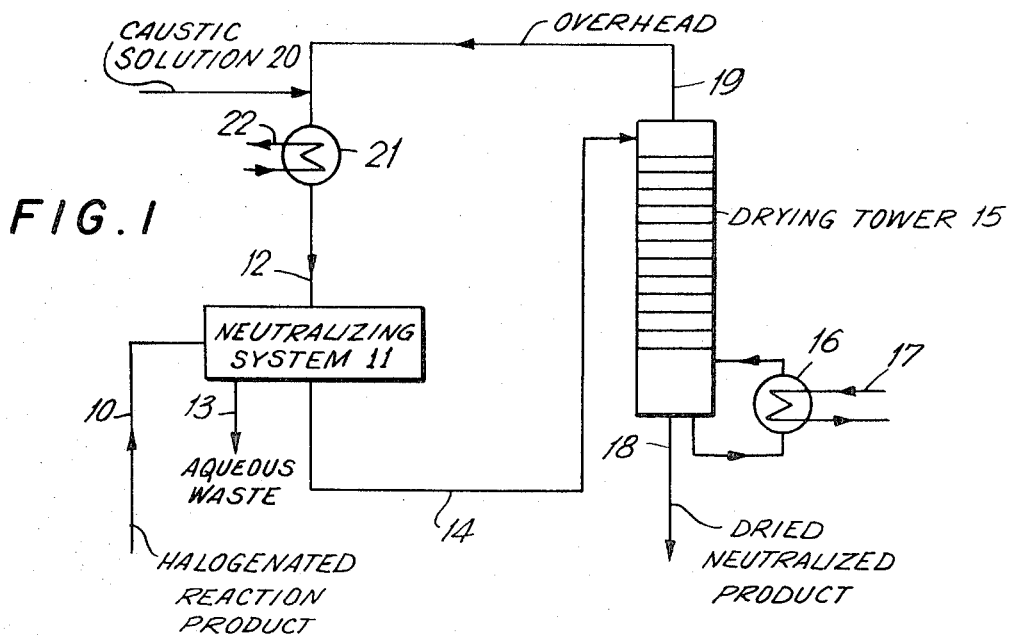
FIG. 1 is a diagrammatic illustration of the apparatus and process of the invention.

FIG. 1, which graphically illustrates the process and apparatus of the present invention will be described in detail immediately following the description of FIG. 2 which relates to the prior art.

Figure 2:
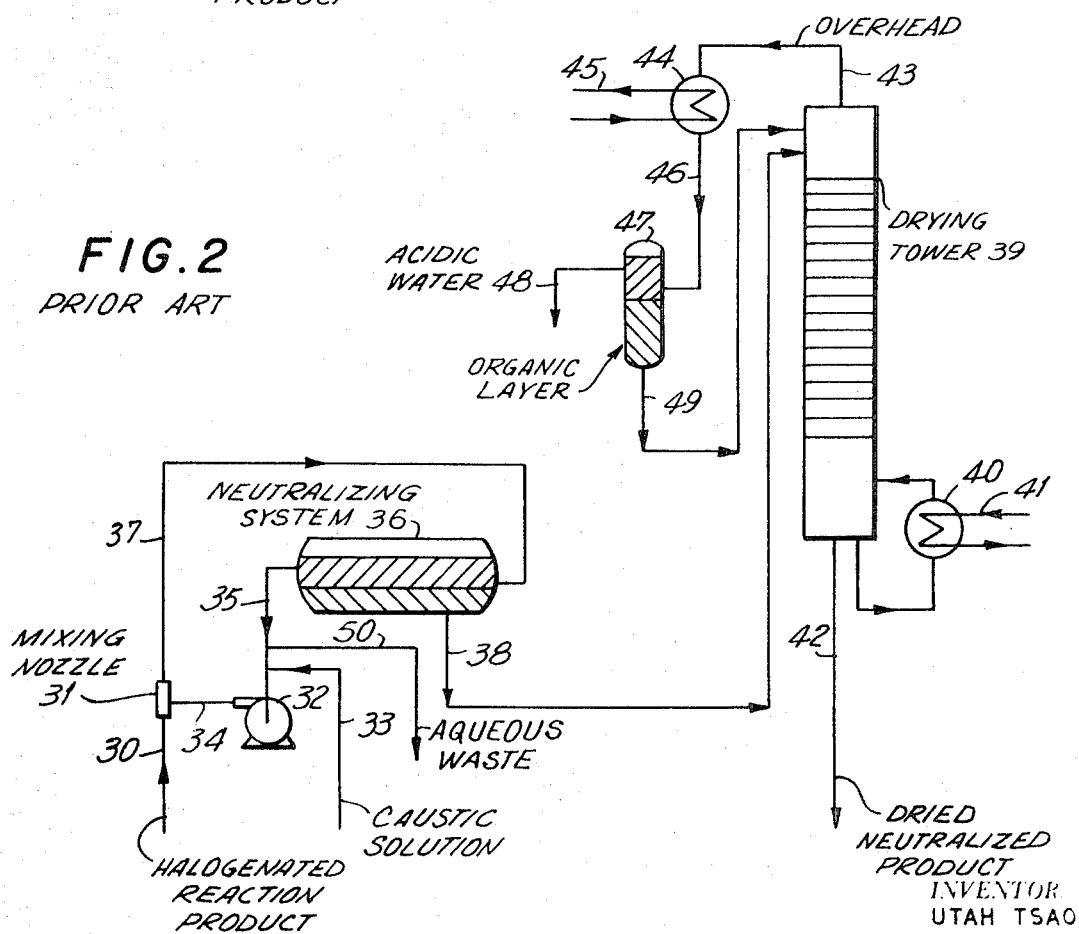
FIG. 2 is a diagrammatic representation of the prior art.

In FIG. 2 a halogenated reaction product containing for example EDC, water and HCl is conducted via conduit 30 to mixing nozzle 31 where it is mixed with a stream driven by pump 32 through conduit 34; said stream consisting of a caustic solution received via conduit 33 and a caustic recycle 35 coming from neutralizing system 36. Conduit 50 coming from caustic recycle 35 before its junction with conduit 33 is provided for removing aqueous waste from the neutralizing system 36. The mixture of the halogenated reaction product and the stream which are mixed in the mixing nozzle 31 is fed to neutralizing system 36 via conduit 37, where the caustic neutralizes the HCl in the reaction product. In the neutralizing system, the mixture separates by gravity into organic and aqueous layers, of which the aqueous layer is the caustic recycle 35 which is recycled to the mixing nozzle. The organic layer which consists of neutralized EDC and water dissolved therein is conducted by conduit 38 to drying tower 39 where the dissolved water is removed by azeotropic distillation. The drying tower is maintained at distillation temperature by means of a reboiler 40 heated by steam coursing through heating element 41. The overhead from drying tower 39, consisting of an azeotropic mixture of EDC and water contains a trace amount of HCl formed by decomposition of the EDC in the drying tower 39 is conducted via conduit 43 through condenser 44 cooled by water coursing through cooling element 45. The overhead is condensed in condenser 44 and thereafter conducted via conduit 46 to separating drum 47 where the condensed overhead is separated into two phases. One of said phases is an aqueous waste phase which is acidic and which is removed via conduit 48. The other of said phases is an organic phase which essentially consists of EDC and which is recycled to drying tower 39 by means of conduit 49. Pure dry neutralized EDC is removed from drying tower 39 via conduit 42. Inspection of FIG. 2 and the preceding description reveal that according to the prior art process, the neutralization and drying of the halogenated reaction product are essentially separate processes, conducted in separate apparatuses connected only by conduit 38 which transports the neutralized product to the drying system for drying therein. As a result of the fact that the two processes, i.e. neutralization and drying, are separately conducted, it is evident that the entire overhead system including conduits 43, 46, 48 and 49, condenser 44 and separating drum 47 must be protected against the corrosive effect of the HCl in the overhead. This protection is effected by constructing these portions of the apparatus of materials which are corrosion-resistant.

In addition, according to the prior art process, care must be taken when discarding the acidic aqueous waste phase removed from separating drum 47 via conduit 48. From the detailed description of FIG. 1 which follows, it will be apparent that these and other disadvantages of the prior art process are obviated.

In FIG. 1, a reaction product comprising a halogenated organic compound, preferably a chlorinated compound and in a most preferred embodiment, ethylene dichloride (EDC), water and a corrosive acid, which in the case of a chlorinated compound is HCl is introduced to neutralizing system 11 via conduit 10. There is simultaneously introduced to neutralizing system 11 via conduit 12, a recycle stream to which has been added a caustic such as sodium or potassium hydroxide, generally in the form of a solution. In neutralizing system 11, the reaction product is contacted, preferably countercurrently, with the recycle stream to thereby neutralize all the corrosive acid in the reaction product. Moreover, in neutralizing system 11, the neutralized reaction product and recycle stream are separated into first and second phases which are respectively aqueous and organic phases. The aqueous phase is essentially all water which is slightly alkaline and contains alkali halide formed in the reaction between the corrosive acid and the caustic. The aqueous phase may further contain a trace amount of halogenated organic compound.

The organic phase which is neutralized, halogenated organic compound having water dissolved therein is conducted by conduit 14 to drying tower 15 where said organic phase is azeotropically distilled. The drying tower 15 is maintained at operating temperature and pressure by means of a steam reboiler 16 which is heated by steam coursing through heating element 17.

The dissolved water is removed overhead in the form of an azeotrope with the halogenated organic compound. As a result of a slight degree of decomposition of the halogenated organic compound during distillation thereof, the overhead contains a trace amount of the corrosive acid. The overhead is removed from the drying tower by conduit 19 and is ultimately recycled to neutralizing system 11. However, before being returned to neutralizing system 11, the overhead is mixed with caustic, preferably an alkali hydroxide such as NaOH or KOH injected into the overhead by means of conduit 20. By mixing the overhead with caustic before returning same to neutralizing system 11, the trace amount of corrosive acid in the overhead is neutralized and there is no need to protect against the corrosive effect of the acid at any point between the site of mixing and neutralizing system 11. The overhead to which caustic has been added is then conducted to condenser 21, cooled by water coursing through cooling element 22 where the overhead is condensed. From condenser 21, the condensed overhead containing caustic is recycled, via conduit 12 to neutralizing system 11 where incoming reaction product is neutralized thereby, thus completing a continuous cycle. From the bottom of drying tower 15 there is removed via conduit 18 dried, neutralized halogenated organic compound.

By performing the process as described above, the neutralizing and drying operations are integrated by means of a feedback loop and thus the caustic can be introduced to the overhead upstream of condenser 21. By virtue thereof, the acidic overhead is neutralized and the condenser can be constructed of relatively inexpensive carbon steel, while according to the prior process condenser 44 (in FIG. 2) must be protected. Moreover, separating drum 47 and its associated apparatus are dispensed with, thereby achieving even greater economy and ease of operation. Finally, there is no acidic waste phase to be contended with as in the prior art process and this too results in an economic advantage as compared with the known process.

The following example is given by way of illustration only and is not to be construed as limitative of the invention which is defined in the appended claims. It will be understood by those skilled in the art that reaction products other than the specific material described in the Example may be processed to like effect and that the invention is not confined to ethylene dichloride which is merely a preferred species of halogenated organic compound.

EXAMPLE

A reaction product consisting of 10,000.2 parts by weight (all parts hereinafter given are by weight) of EDC, 20 parts of water and 1 part of HCl at a temperature of 100° F. is conducted by means of conduit 10 to neutralizing system 11 which is a packed countercurrent liquid-liquid extraction column constructed of glass lined steel.

In the neutralizing system 11, the reaction product is countercurrently contacted with a recycle stream including caustic soda to thereby neutralize the HCl contained therein. The source and introduction of said recycle stream will be described in greater detail below. The mixture consisting of the reaction product and the recycle stream is separated in neutralizing system 11 into aqueous and organic phases. The aqueous phase consisting of 44.5 parts of water, 1.6 parts of sodium chloride formed by reaction between caustic soda and HCl, 0.2 parts of caustic soda and 0.2 parts of EDC is removed from neutralizing system 11 via conduit 13 and may if desired be discarded as is. The organic phase consisting of 12,000 parts of EDC and 24 parts of water dissolved therein is conducted at a temperature of 100° F. via conduit 14 to the upper portion of drying tower 15, which upper portion is constructed of nickel alloy. The drying tower 15 is maintained by means of steam reboiler 16, heated by steam coursing through heating element 17 at a temperature of 185° F. and a pressure of 1 psig in the upper portion thereof while in the lower portion thereof it is maintained at a temperature of 200° F. and a pressure of 5 psig. Except for the upper portion of the drying tower, all parts thereof are made of carbon steel.

In drying tower 15, the organic phase is subjected to two-phase azeotropic distillation to obtain via conduit 18 a bottom fraction consisting of 10,000 parts of dried, neutralized EDC which may be used as such or stored under a dry-gas blanket for later use. The distilled overhead from drying tower 15 is an azeotrope comprising 2,000 parts of EDC and 24 parts of water and in addition includes a trace (less than 10 ppm) of HCl, all of which are at a temperature of about 185° F. The HCl is formed as a result of some slight degree of decomposition of the EDC during distillation thereof. The overhead is removed from the drying tower 15 via conduit 19 and is mixed therein with a feed solution of 1.3 parts of sodium hydroxide (caustic soda) in 24 parts of water conducted via conduit 20. The resulting mixture of the overhead and solution of caustic soda is cooled to 100° F. by passage through condenser 21, which is cooled by water coursing through cooling element 22. The cooled mixture is conducted from condenser 21 via conduit 12 to neutralizing system 11 and constitutes the recycle stream which countercurrently contacts the reaction product. The entire overhead system, i.e., all parts of the apparatus downstream of the point at which the overhead is mixed with caustic are constructed of carbon steel since there is present no HCl to protect against between that point and the neutralizing system.

Similarly, in the case of the reaction products of the chlorination of benzene, and the bromination of ethylene, the chlorination and bromination products must be washed with caustic and azeotropically dried.

In the alkylation process, for example, the Friedel-Kraft alkylation of benzene or other hydrocarbons, in which ethyl benzene is produced with the use of an aluminum chloride-HCl catalyst and also in the isomerization process in which alkyl aromatics are disproportionated with the use of an aluminum chloride-HCl catalyst, the reaction products must be both neutralized and dried. In effecting these operations, the present process is applicable as well as the present apparatus, and in these instances, like results obtain.

What is claimed is:

1. In a process wherein a reaction product including a halogenated or alkylated hydrocarbon compound, water and a corrosive acid is neutralized with caustic in a neutralizing zone, an improvement which comprises:
   1. introducing to said neutralizing zone
      a. said reaction product and
      b. a recycle stream to which said caustic is added prior to the introduction of said stream to said neutralizing zone to neutralize the corrosive acid in said reaction product,
   2. separating the neutralized reaction product into an aqueous phase and an organic phase,
   3. azeotropically distilling the organic phase to thereby obtain a dried, neutralized halogenated or alkylated hydrocarbon compound and an overhead which is the recycle stream to which said caustic is added.

2. The process as claimed in claim 1 wherein the neutralization is effected by contacting the reaction product countercurrently with the recycle stream to which said caustic is added.

3. The process as claimed in claim 1 wherein the reaction product is essentially a halogenated hydrocarbon compound and the corrosive acid and water are present in the reaction product in relatively small amounts.

4. The process as claimed in claim 1 wherein the reaction product is essentially an alkylated hydrocarbon compound and the corrosive acid and water are present in the reaction product in relatively small amounts.

5. The process as claimed in claim 1 wherein the overhead is essentially halogenated hydrocarbon compound, water comprises a relatively small amount of the overhead and the corrosive acid comprises a trace amount of the overhead.

6. The process as claimed in claim 5 wherein the trace amount of corrosive acid in the overhead is formed from the halogenated hydrocarbon compound by decomposition thereof during the azeotropic distillation.

7. The process as claimed in claim 1 wherein the caustic is added to the recycle stream as a dilute aqueous solution of caustic.

8. The process as claimed in claim 1 wherein the corrosive acid is hydrochloric acid and the caustic is an alkali metal caustic.

9. The process as claimed in claim 1 wherein the halogenated organic compound is a chlorinated hydrocarbon compound.

10. The process as claimed in claim 9 wherein the chlorinated hydrocarbon compound is ethylene dichloride.

11. The process as claimed in claim 9 wherein the halogenated hydrocarbon compound is a brominated hydrocarbon compound.

12. The process as claimed in claim 11 wherein the brominated hydrocarbon compound is ethylene bromide.

13. The process as claimed in claim 1 wherein the alkylated hydrocarbon compound is an alkylated benzene.

14. The process as claimed in claim 13 wherein the alkylated benzene is an ethyl benzene.

15. The process as claimed in claim 1 wherein the neutralization is effected at a temperature of about 100° F. and the azeotropic distillation is effected at a temperature of about 185° – 200° F., and further comprising cooling the overhead to about 100° F. after adding caustic thereto.

* * * * *